UNITED STATES PATENT OFFICE.

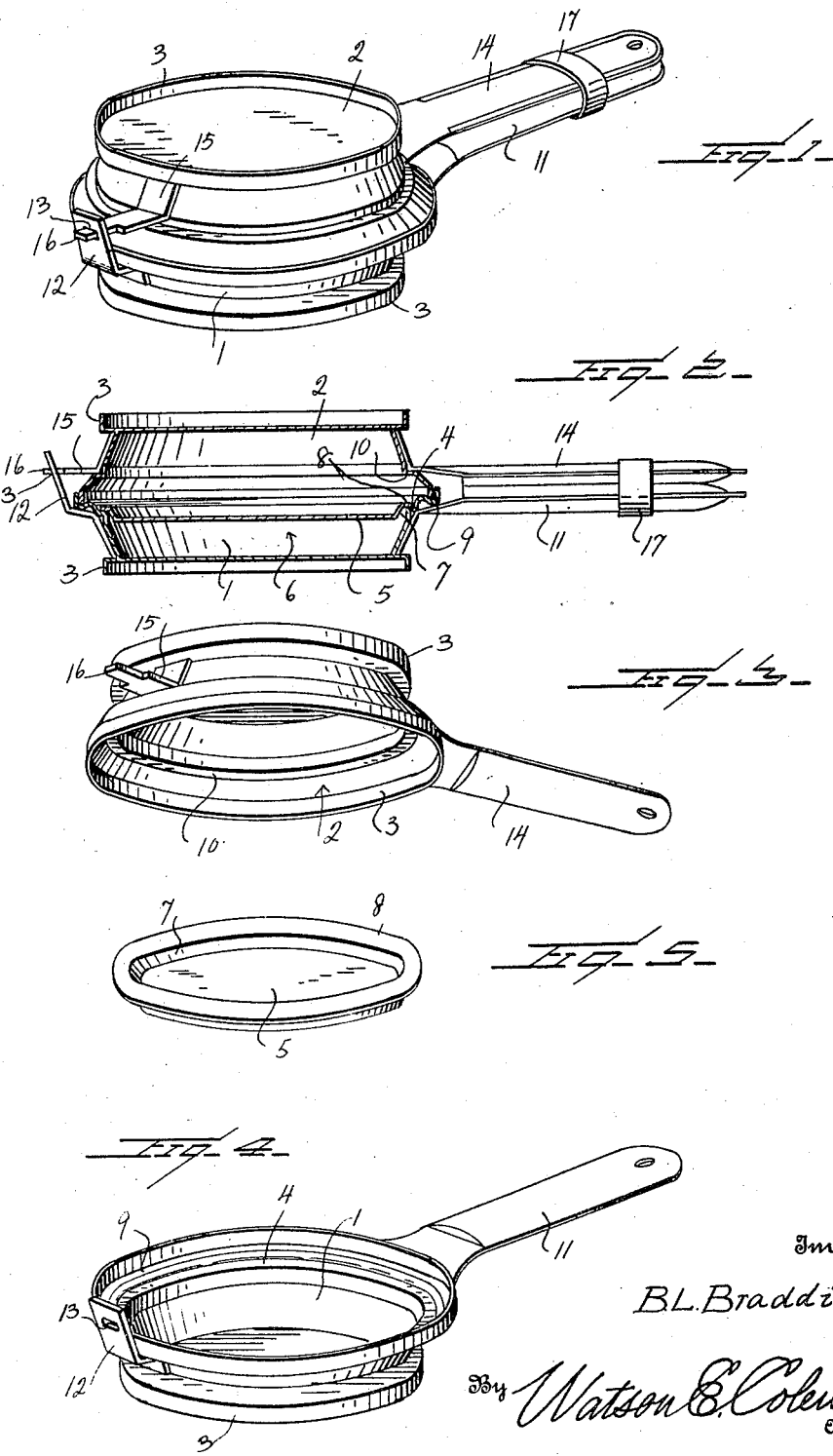

BERNARD L. BRADDICK, OF SAN DIEGO, CALIFORNIA.

PIE AND CAKE BAKER.

1,324,297.

Specification of Letters Patent.  Patented Dec. 9, 1919.

Application filed July 7, 1919. Serial No. 309,047.

*To all whom it may concern:*

Be it known that I, BERNARD L. BRADDICK, citizen of the United States, residing at San Diego, in the county of San Diego and State of California, have invented certain new and useful Improvements in Pie and Cake Bakers, of which the following is a specification, reference being had to the accompanying drawings.

This invention relates to an improved pie and cake baker, which may be conveniently used indoors, or outdoors for instance by camping parties, and one of the objects of the invention is to provide a baker of this kind that will utilize very little heat, in fact will necessitate but a little fire to heat the opposite members of the baker.

A further object of the invention is to provide a baker of this kind comprising two handle sections including means for holding them together, and a removable partition between the two sections, whereby an air space may be afforded between the two sections, where as heretofore the air space has been used exterior of the sections where the baking proper is performed. In the present device, owing to the arrangement of the air space, the heat will very readily reach the contents of the baker, without being transmitted through several thicknesses of metal.

A further object of the invention is to provide a pie and cake baker of this kind, which dispenses with a fire pot as heretofore used. Also by reversing the sections in the present device alternately, the baker may be kept at substantially an even heat.

A further object of the invention is to provide a pie and cake baker, comprising two sections, which are detachably secured together, there being suitable groove connections between the two sections to hold the sections fitting tightly together, one of the sections having an additional groove, which holds a pie and cake plate, which constitutes a partition, for the purpose of providing an air space between the plate and one of the sections. By means of the groove connections between the two sections, considerable of the heat is prevented from escaping.

A further object of the invention is to provide an improved connection between the sections such as a horizontally reduced tongue on one section to enter a slot of a tongue on the adjacent section, for instance the bottom section, to hold the sections together. By constructing the reduced tongue horizontally, it has been found very much easier to connect the two sections, simply by inserting the reduced tongue through the slot, and then closing the two sections concentrically, so that one may engage the groove of the other, in combination with means to fit over the handles of the sections to draw them securely together.

It has been found that a pie and cake baker of this kind may be employed over any kind of a stove, either an oil or gas stove, or an electric apparatus, or may be used equally as well over a camp fire.

A further object of the invention is to provide the bottoms of each section with annular flanges, to keep the flame from being deflected in contact with the opposite sides of the sections, that is from licking the sides of the sections, and in this way concentrate as much heat as possible directly on the bottom of either section.

A further object of the invention is to provide a pie and cake baker of this kind, of which either section may be used as the top section or as the bottom section. In other words, either section may be subjected to the heat or either section may support the pie plate with the cake or pie thereon.

While the design and construction as at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a perspective view of the improved pie and cake baker constructed in accordance with the invention.

Fig. 2 is a longitudinal sectional view through the same, showing the pie plate or partition arranged between the sections, and supported by the groove of one of the sections.

Fig. 3 is a perspective view of one section looking upwardly.

Fig. 4 is a perspective view of the other section looking downwardly and in the position under the section shown in Fig. 3, so as to illustrate that the two sections may be brought toward each other and fastened together.

Fig. 5 is a detail perspective view of the pie plate or partition shown in Fig. 2.

Referring more especially to the drawings, 1 and 2 designate the two sections of the pie and cake baker. Each section adjacent the bottom is provided with an annular flange 3, which constitutes means to prevent the flame from licking the side of the section when placed over the fire. This annular flange extends laterally as shown.

The section 1 which primarily may constitute the bottom section has its flange provided with an annular groove 4, which receives the pie plate 5 of the construction shown, and which constitutes a partition between the two sections. This pie plate or partition when arranged in place in engagement with the groove 4 is spaced from the interior surface of the bottom of the section 1, thereby providing an air space 6. This pie plate or partition has an upturned flange 7, which merges into a radial part 8, which engages the groove 4 of the annular flange of the section 1. The annular flange of the section 1 is provided with an additional groove 9, which receives the marginal edge portion of the laterally and outwardly extending flange of the section 2, that is when the section 2 is arranged concentrically with the section 1, so that the two sections may fit tightly together. The laterally and outwardly extending flange of the section 2 is provided with an annular rib 10, which may be engaged by the flange of the partition or pie plate, to support said plate, provided the section 2 is employed as the bottom section, for it is obvious that either section may be used as the bottom or top section. Secured to the laterally and outwardly extending flange of the section 1 in any suitable manner, at a point substantially diametrically opposite the handle 11 of the section is a tongue 12 provided with a slot 13. The laterally and outwardly extending flange of the section 2 has secured to it at a point diametrically opposite the handle 14 a radial plate lug 15 provided with a reduced tongue 16, which enters the slot of the tongue of the section 1, to latch the two sections together. The reduced tongue may be inserted radially through the slot. Forming the reduced tongue radially relatively to the laterally and outwardly extending flange of the section 2, will permit the tongue to more easily enter the slot, when it is the aim to connect the two sections. A circular loop or band 17 is designed to pass over the two handles 11 and 14 to draw the two sections tightly together, whereby the marginal edge of the laterally and outwardly extending flange of the section 2 may fit tight into its receiving groove of the laterally and outwardly extending flange of the section 1.

When the section 1 is placed directly over the fire and becomes thoroughly heated, the top section 2 may be removed, and the pie plate or partition with the pie or cake on it may be placed in the top section, after which the top section may be placed over the fire, then the bottom section 1 may be placed over the top section. When the top section which is then on the bottom becomes thoroughly heated, the bottom section, which is on the top may be removed, the pie plate or partition with the pie thereon transferred thereto and placed over the fire, after which the top section, which has been heretofore used on the bottom, is then returned to the top. These manipulations of the two sections may be consecutively repeated, possibly two or three times for fifteen or twenty minutes, so as to thoroughly cook the contents of the pie plate or pan, the air space between the pan and the bottom of either section preventing the contents of the pie plate from burning.

The invention having been set forth, what is claimed as new and useful is:

1. In a pie and cake baker, the combination with a pair of complemental pan sections, one adapted to be inverted and inserted over the other, the lateral and outwardly extending flange of one section having an annular groove to receive the marginal edge of the corresponding flange of the other section, the flange of either section having annular supporting means, a pie plate or partition engaging said supporting means, and means for holding the two detachable sections together, the bottom of either section near its marginal portion being provided with a laterally extending annular flange, thereby preventing the blaze from the fire from licking the side of the upturned flange.

2. In a pie and cake baker, the combination with a pair of complemental pan sections, one being inverted over and engaging the other, the lateral and outwardly extending flange of one section having an annular supporting shoulder, of a pie plate engaging said shoulder, thereby dividing the sections at a point where they are united, into air spaces, the lateral and outwardly extending flange of one section having an ear extending laterally and provided with a slot, the lateral and outwardly extending flange of the other section having a radial ear provided with a reduced tongue engaging said slot, said sections having adjacent handles diametrically opposite the slotted tongue and ears, and means engaging the two handles to hold the sections tightly together.

3. In a pie and cake baker, the combination with a pair of complemental pan sections, one being inverted over and engaging the other, the lateral and outwardly extending flange of one section having an annular supporting shoulder, of a pie plate engaging said shoulder, thereby dividing the sections at a point where they are united, into air spaces, the lateral and outwardly extending flange of one section having an ear extending laterally and provided with a slot, the lateral and outwardly extending flange of the other section having a radial ear provided with a reduced tongue engaging said slot, said sections having adjacent handles diametrically opposite the slotted tongue and ears, and means engaging the two handles to hold the sections tightly together, the bottom of each section near its marginal portion having annular flanges angular in cross-section, thereby preventing the flame from the fire from licking the sides of the lateral and outwardly extending flange of the section.

In testimony whereof I hereunto affix my signature in the presence of two witnesses.

BERNARD L. BRADDICK.

Witnesses:
NAOMI PERKINS,
NAT McDOWELL.